W. Haslup,
Water Wheel.
No. 104,026. Patented June 7, 1870.
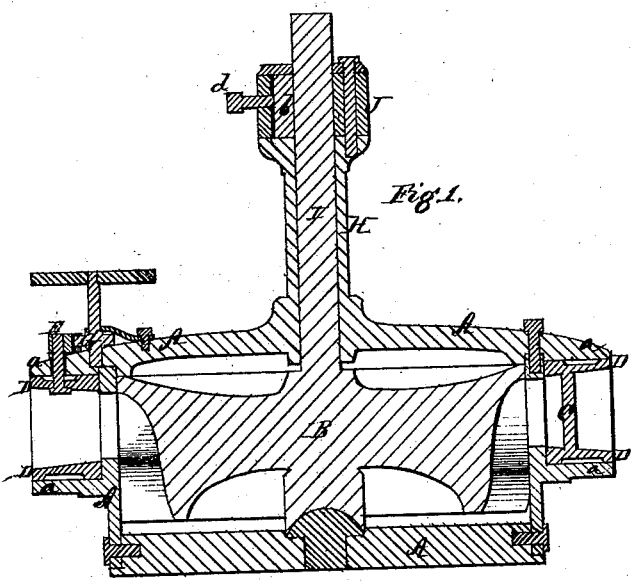
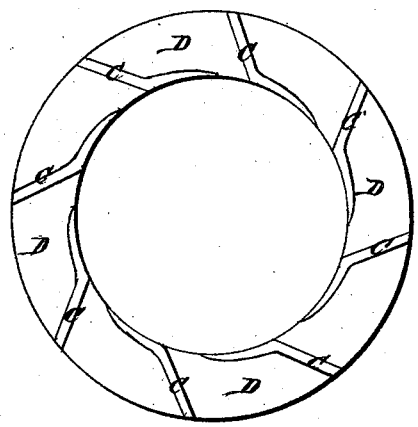
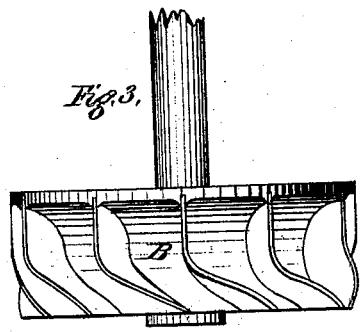
Witnesses
John A. Ellis
Henry N. Miller
Inventor
Wm Haslup
Per
J. H. Alexander,
Atty.

United States Patent Office.

WILLIAM HASLUP, OF SIDNEY, OHIO.

Letters Patent No. 104,026, dated June 7, 1870.

IMPROVEMENT IN WATER-WHEELS.

The Schedule referred to in these Letters Patent and making part of the same

*To all whom it may concern:*

Be it known that I, WILLIAM HASLUP, of Sidney, in the county of Shelby and State of Ohio, have invented certain new and useful Improvements in Water-Wheels; and I do hereby declare that the following is a full, clear, and exact description thereof, reference being had to the accompanying drawings and to the letters of reference marked thereon, which form a part of this specification.

The nature of my invention consists in the construction and arrangement of a water-wheel with chutes for opening and closing the apertures in the wheel-case.

In order to enable others skilled in the art to which my invention appertains to make and use the same, I will now proceed to describe its construction and operation, referring to the annexed drawings, in which—

Figure 1 is a vertical section of the entire wheel complete;

Figure 2 is a horizontal section of the chutes; and

Figure 3 is a side view of the wheel.

A represents the wheel-case within which the wheel B revolves.

The case A is provided with a series of suitable openings through which the water passes in to the wheel.

Above and below said openings are projecting flanges *a a*, for the purpose of inclosing the chutes.

The chutes C C, which are substantially united with upper and lower flange plates or rims D D are flaring outwardly and contracting inwardly until the water strikes the wheel, for the purpose of gaining force and power. The rims D D are of such size as to fit around the wheel-case and between the flanges *a a*.

The foot of the chutes C C are so constructed and turned as to fit neatly on the wheel-case, and form the wicket that opens and closes the openings in the wheel-case by which the wheel is supplied with water.

A rack, E, is secured to the upper rim D, and a pinion, G, gearing with said rack on top of the wheel-case, allows the operator to close or open, or only partially open, the chutes, thus regulating the amount of water to be supplied to the wheel.

The upper plate or lid of the wheel-case is provided with a tube, H, through which the wheel-shaft I passes.

On top of said tube H, and around the shaft, is placed a collar, J, having on its inner side three vertical recesses, in which are fitted blocks *b b*, and said blocks, being pressed inward by means of screws *d d* from the outside, thus form a bushing to tram the wheel at pleasure, when necessary, without disturbing any other part of the wheel or casing.

Having thus fully described my invention,

What I claim as new, and desire to secure by Letters Patent, is—

The water-wheel B within the case A, said wheel having a dome-formed concavity beneath, and a more superficial depression above, and buckets ascending vertically about half their length, then curving rearward and downward, as shown, in combination with the annular series of chutes C C between the upper and lower plates D D, the said chutes flaring in straight lines outwardly, and fitting in segments so as to form a register with the intermediate gate, and moved by the pinion and ratchet E G, all substantially as shown and described.

In testimony that I claim the foregoing as my own, I affix my signature in presence of two witnesses.

WM. HASLUP.

Witnesses:
J. F. FROZER,
H. B. BLAKE.